G. S. TIFFANY.
TELAUTOGRAPHIC APPARATUS.
APPLICATION FILED MAR. 29, 1912. RENEWED DEC. 11, 1918.

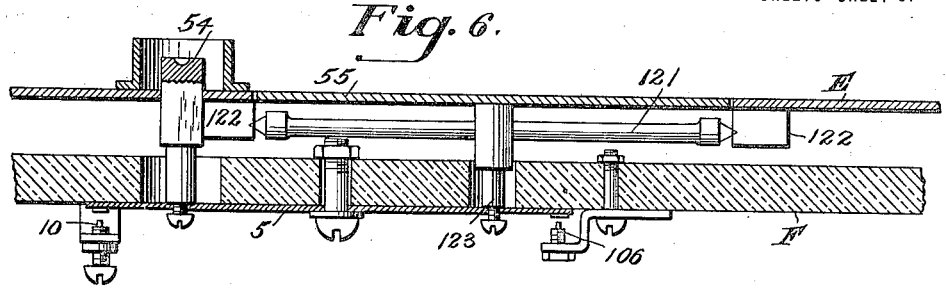
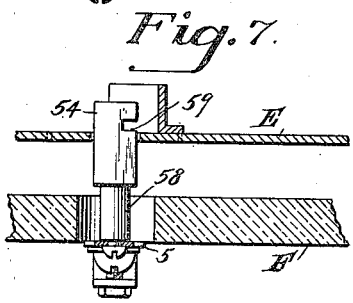
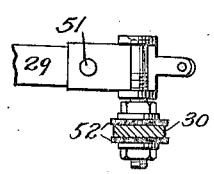
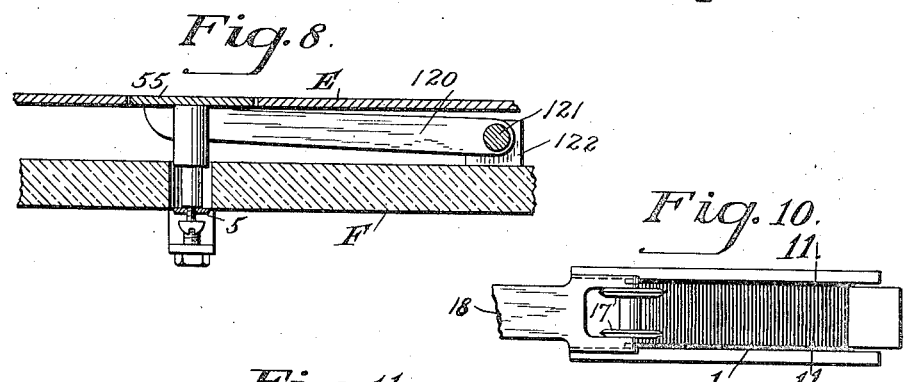
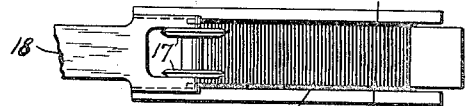

1,312,596.

Patented Aug. 12, 1919.

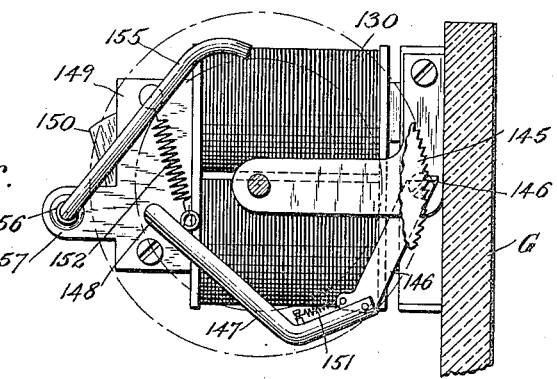
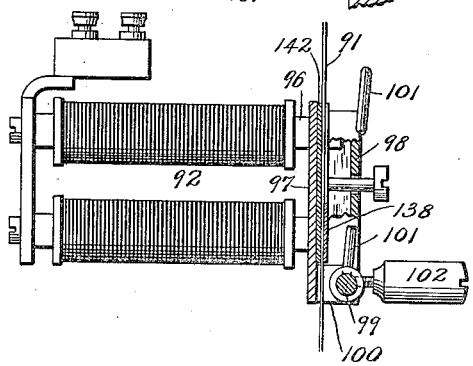
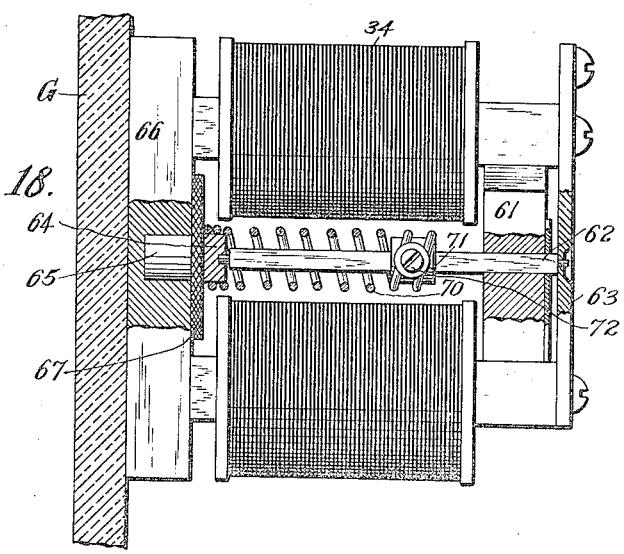

UNITED STATES PATENT OFFICE.

GEORGE S. TIFFANY, OF SUMMIT, NEW JERSEY, ASSIGNOR TO GRAY NATIONAL TELAUTOGRAPH COMPANY, OF NEW YORK, N. Y., A CORPORATION OF VIRGINIA.

TELAUTOGRAPHIC APPARATUS.

1,312,596.  Specification of Letters Patent.  Patented Aug. 12, 1919.

Application filed March 29, 1912, Serial No. 687,033. Renewed December 11, 1918. Serial No. 266,365.

*To all whom it may concern:*

Be it known that I, GEORGE S. TIFFANY, a citizen of the United States, residing at Summit, county of Union, and State of New Jersey, have invented certain new and useful Improvements in Telautographic Apparatus, fully described and represented in the following specification and the accompanying drawings, forming a part of the same.

This invention relates to improvements in telautographic systems of the type in which the writing movements of the receiving pen in unison with the transmitting tracer are effected by variations in the strength of the currents traversing the main or tracer lines from a suitable source of electric energy, which variations are effected by the writing or tracing movements of the tracer. In telautographs of this type as heretofore generally used, the movements of the receiver pen across its writing field have been effected by magnetic coils in the tracer line circuits and movable rectilinearly in a magnetic field which is excited, in a transmitting operation, by a local source of electric energy other than that then supplying current to the tracer lines.

It is the primary object of the present invention to provide a telautographic system of this same general type but operating upon a different principle, in so far as the pen-moving parts are concerned, that is to say, the pen-moving magnetic devices and connections between them and the receiving pen; the present invention also providing and adopting for use in connection with such pen-moving parts a transmitter mechanism of novel construction, as well as means, controlled from the transmitter, for effecting the movements of the receiving pen to and from its writing platen and for vibrating the pen-moving parts at the receiver to reduce their inertia or the frictional resistance to movement of such parts during a transmitting operation. The invention also includes other features of improvement, the details of which will be hereinafter pointed out, in connection with the accompanying drawings, in which—

Fig. 6 is a vertical sectional detail of the transmitter platen and the means for controlling the tracer line circuits and the receiver pen-lifting circuit.

Fig. 7 is a vertical sectional detail on the line 7 of Fig. 3.

Fig. 8 is a vertical sectional detail on the line 8 of Fig. 3.

Fig. 9 is a detail in vertical elevation on the line 9 of Fig. 3.

Fig. 10 is a detail of one of the rheostats and its roller contacts through which current is shunted from the source of electric energy into the main lines.

Fig. 11 is a section of the same on the line 11 of Fig. 10.

Fig. 16 is a side view of the paper shifting magnet and connected parts.

Fig. 17 is a side view, partly in section, of the pen lifter magnet and connected parts; and Fig. 18 is a side view, partly in section, of the receiving pen-moving magnet and connected parts.

Figure 1:
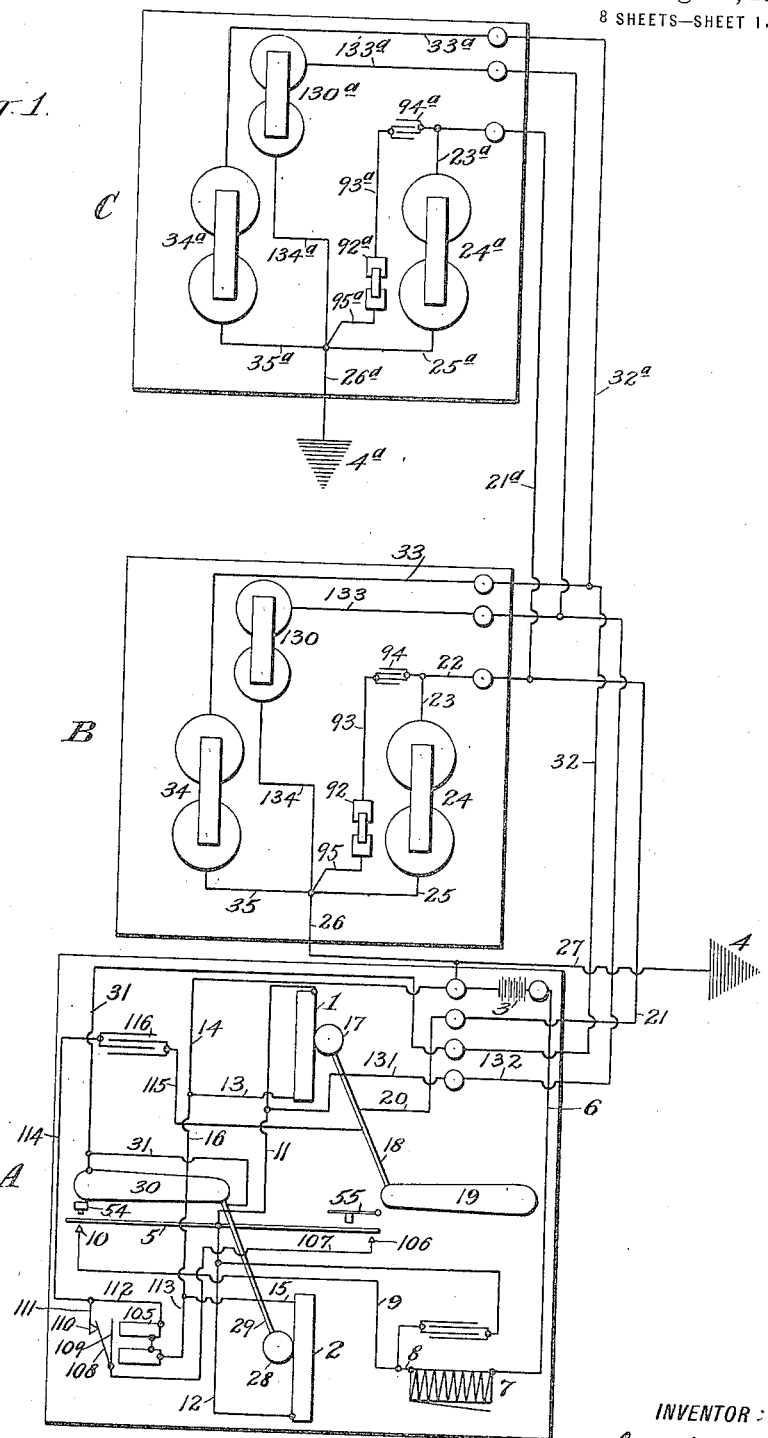
Figure 1 is a diagrammatic view of a telautographic system embodying the present invention.

In the diagrammatic view (Fig. 1), one transmitter A and two receivers, B, C, in multiple, are shown, the former being local and the other distant with respect to the transmitter. As they are in all respects identical, a detailed description of one will suffice, local receiver B being selected for such purpose. The corresponding parts of the receiver C will have applied to them the same reference numerals as receiver B, with the addition, however, of the reference letter "a," for convenience in tracing and describing circuits. The transmitter parts are, with the exception of the transmitting tracer and immediately connected parts, inclosed in a suitable casing D, having a top plate E, and containing a suitably mounted slab F, of slate or other insulating material, on which most of the internal devices are mounted. The receiver (which is of the vertical type) may also be provided with a suitable casing (not shown), and is provided with a vertical slab G, of slate or other suitable insulating material, on which most of the receiver parts are mounted.

Figure 4:
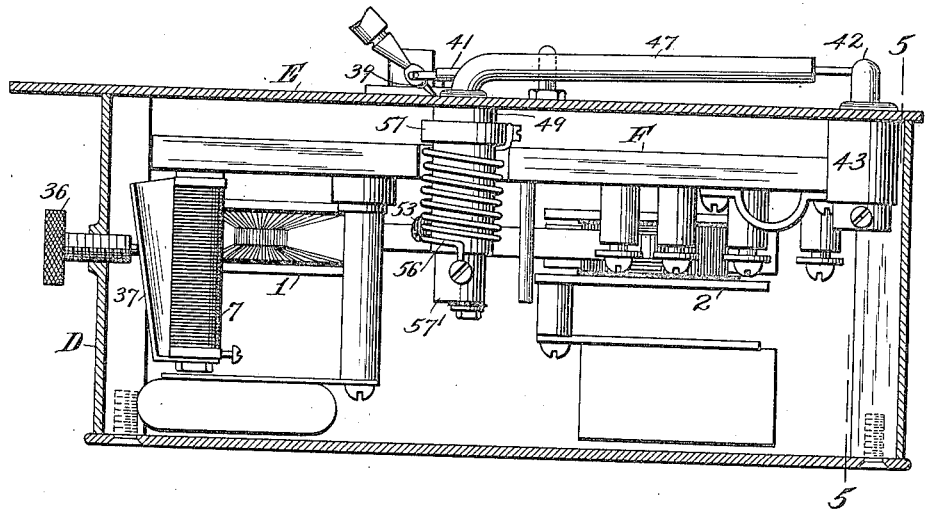
Fig. 4 is a vertical section on the line 4 of Fig. 2.

The transmitter A comprises a pair of rheostats 1, 2, included in a normally open local circuit connected with a source of electric energy, for example, a battery 3, the negative pole of which is grounded at 4, this local current-supplying circuit being controlled by a spring switch contact plate 5, which is manually operated, as hereinafter described. This current-supplying circuit, when closed, consists of wire 6 from the positive pole of battery 3, a rheostat 7, (the function of which will be hereinafter described) wires 8, 9, contact 10, spring contact 5, and thence by wire 11 to right rheostat 1, and by wire 12 to left rheostat 2, and from rheostat 1 by wires 13, 14, and from rheostat 2 by wires 15, 16, 14, to the negative pole of battery 3. From the right and left rheostats 1, 2, currents of varying strength are shunted into right and left tracer or main line circuits leading to the receiver B, these main line circuits being traced as follows: That for the right line comprises a roller contact 17, engaging rheostat 1, spring arm 18, (carried by tracer arm 19) wires 20, 21, 22, 23, the windings of a pair of electromagnets 24, and wires 25, 26, 27, to ground at 4. That for the left line comprises a roller contact 28, engaging left rheostat 2, spring arm 29 (carried by tracer arm 30) wires 31, 32, 33, windings of a pair of electromagnets 34, and wires 35, 26, 27, to ground at 4. The circuits to the distant receiver C are traced from receiver B as follows: For the right line, wires 21$^a$, 23$^a$, electro-magnet 24$^a$, and wires 25$^a$, 26$^a$, to ground at 4$^a$; and, for the left line, wires 32$^a$, 33$^a$, magnet 34$^a$, and wires 35$^a$, 26$^a$, to ground at 4$^a$. The function of the rheostat 7 in the current-supplying circuit is to compensate for any variations in the line resistance or operating voltage and it is adjusted to so compensate for such variations by adjusting, by means of a set screw 36 in casing D, a slide 37 relatively to the rheostat so as to short circuit more or less of the resistance therein (Fig. 4).

It will be understood that when the switch contact 5 engages stationary contact 10 the local current-supplying circuit just described will be closed; that current from battery 3 will, therefore, be on the two main or right and left hand tracer lines just described; and that the currents on these lines, or, in other words, the currents shunted into them from rheostats 1, 2, will vary in strength, on each line, in accordance with the position of the roller contact 17 or 28, respectively, lengthwise of the rheostats 1, 2. Such movements of the roller contacts 17, 28, and therefore, such variations of current on the two lines, are controlled by the transmitting tracer 39, as hereinafter described, and such currents of varying strength control, through the right and left hand electro-magnets 24, 34, the lateral movements of the receiving pen 40 in unison with the lateral movements of the transmitting tracer.

Figure 5:
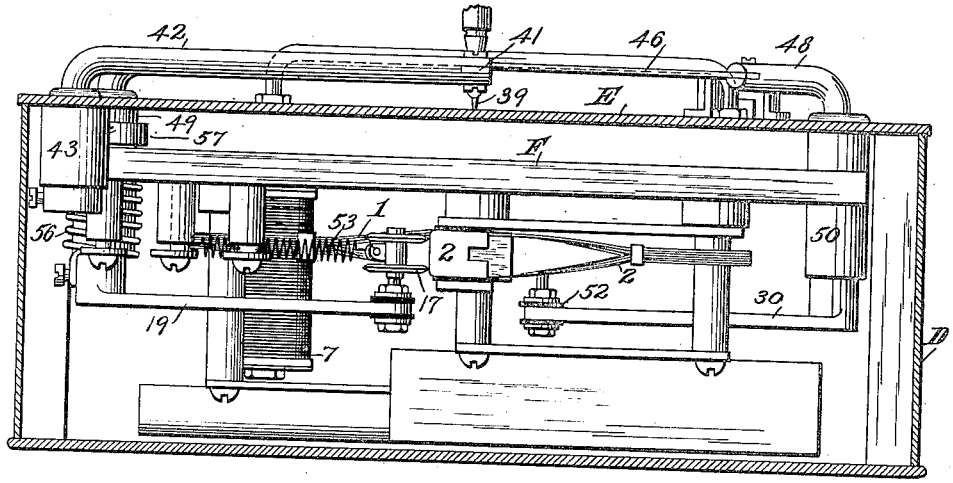
Fig. 5 is a vertical section on the line 5 of Fig. 4.
Figure 12:
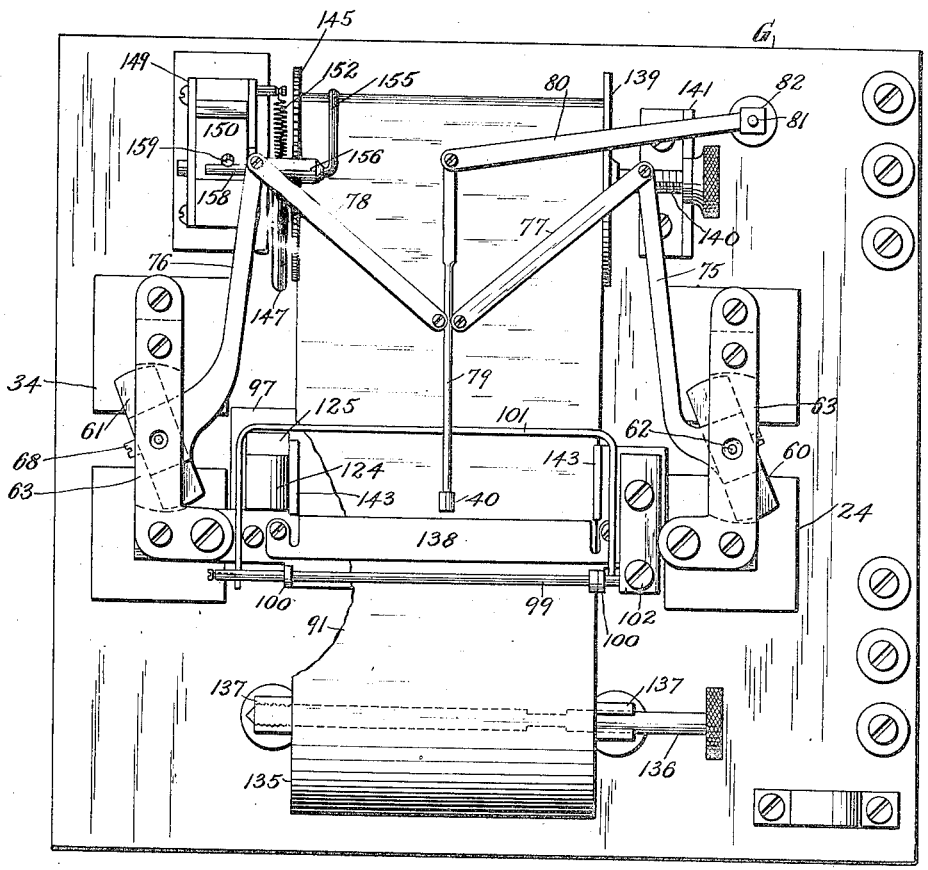
Fig. 12 is a front elevation of the receiver.
Figure 13:
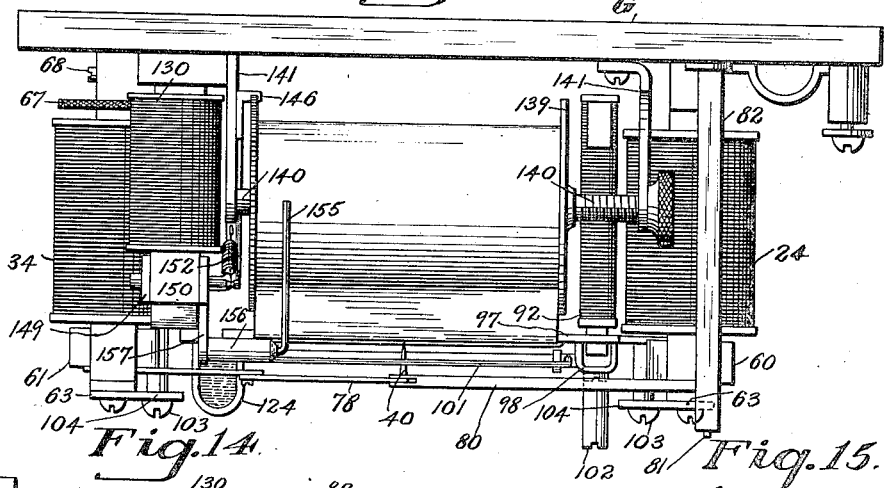
Fig. 13 is a horizontal plan view of the same.
Figure 14:
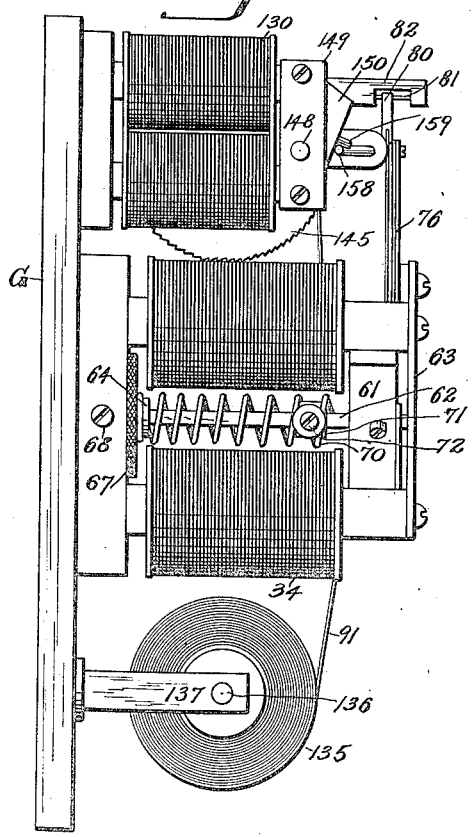
Fig. 14 and 15 are side elevations of the same, looking toward the left and right, respectively, of Fig. 13.
Figure 15:
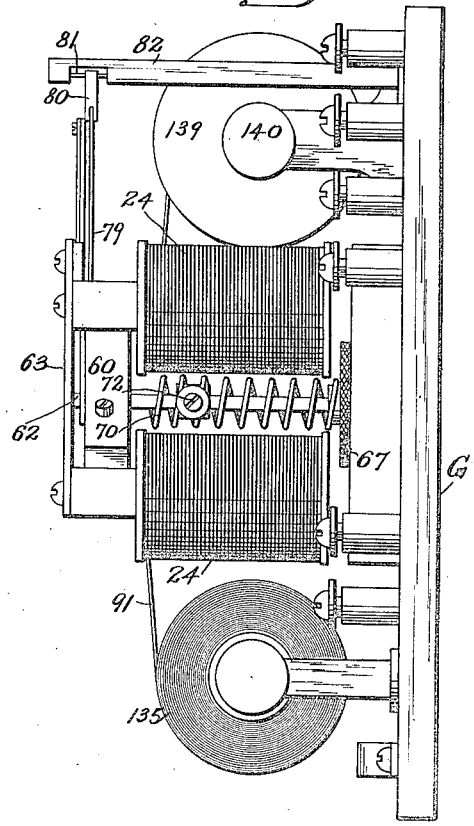

The transmitting tracer 39 (Fig. 2) is connected by a universal joint with one end of an arm 41, the opposite end of which is pivotally connected with a rod 42 pivotally mounted at one end in a hub 43 secured to the under side of the top plate E of the transmitter casing D. Intermediate its ends rod 41 has pivotally connected with it a pair of links 45, 46, which are pivotally connected also with the converging ends of a pair of levers 47, 48, respectively, which are, in turn, pivotally mounted at their opposite ends in hubs 49, 50, secured to the under side of the top plate E. All these movable parts are on the upper side of the top plate. The pivotally mounted ends of the levers 47, 48 (Fig. 3) project downwardly through hubs 49, 50, into the transmitter casing D, and have rigidly secured to their lower ends the arms 19, 30, respectively, heretofore referred to, in which are pivotally mounted the spring arms 18, 29 carrying the rheostat-engaging roller contacts 17, 28, respectively (Figs. 10, 11). Each of the spring arms 18, 29 is preferably in two parts secured together by a screw 51, and said arms are also insulated, as shown, at 52, from the arms 19, 30 (Figs. 5, 9). It will be observed that the lever connections to tracer 39 are such as to provide for a wide range of movement of the tracer, or, in other words, a large field or area of writing for it, with a relatively small movement of the contacts 17, 28, along the rheostats 1, 2.

Figure 2:
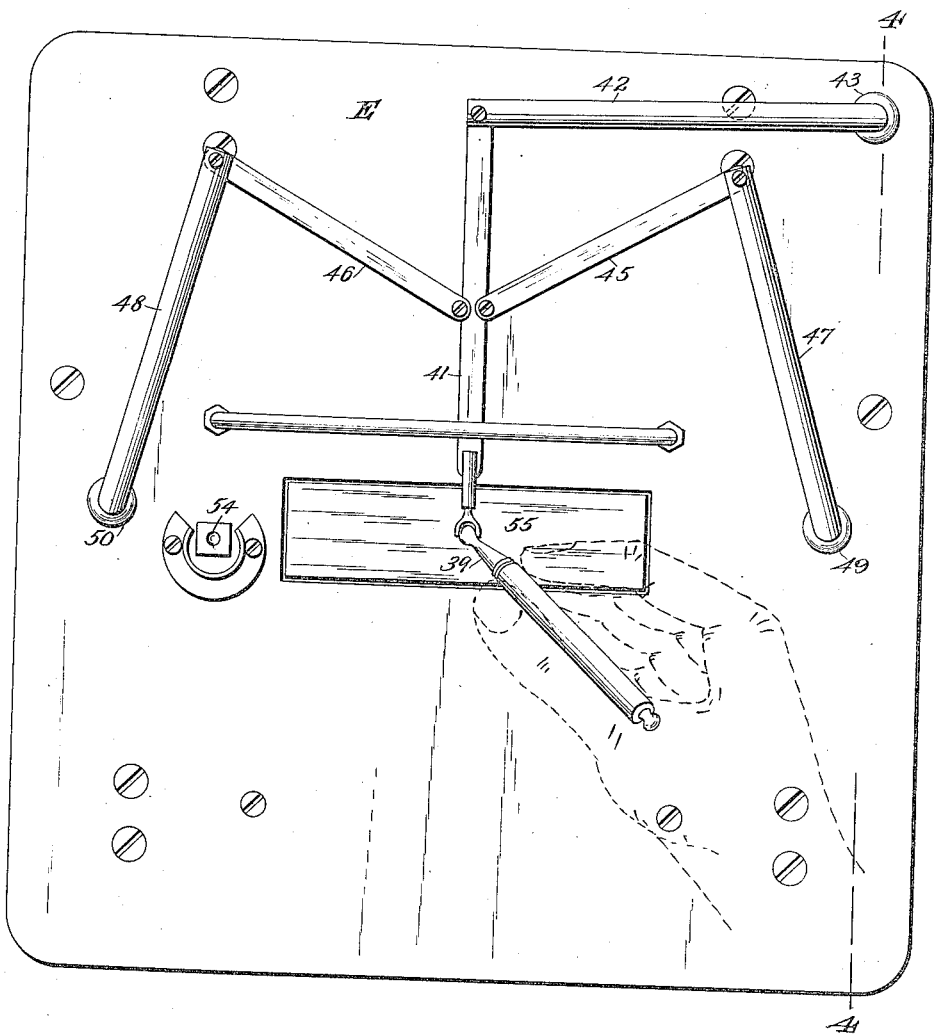
Fig. 2 is a plan view of the transmitter casing, the transmitting tracer and immediately-connected parts.
Figure 3:
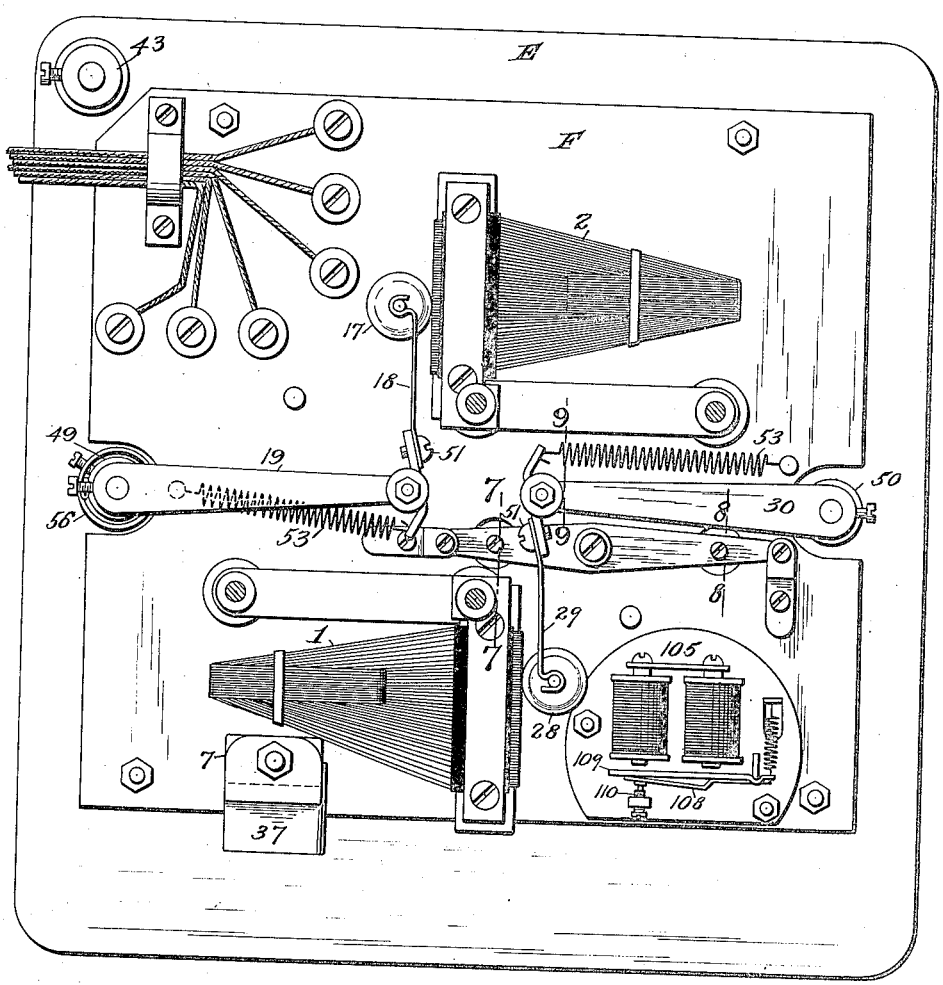
Fig. 3 is a bottom or inverted plan view of the top of the casing and a support carried thereby, of insulating material, in which are mounted most of the transmitter parts.

The contacts 17, 28 are held yieldingly in engagement with the rheostats 1, 2, not only by the resilience of the spring arms 18, 29, which carry them, but also by means of coiled springs 53, connected with the opposite ends of the spring arms, and also with the top plate E (Figs. 3, 5). It will be obvious that as the transmitting tracer 39 is moved laterally over the writing platen 55, as in writing, the contact rollers 17, 28 will be moved along the rheostats 1, 2, in directions and to an extent dependent upon the movement of their respective arms 19, 30, by the transmitting tracer, as is usual in telautographic apparatus of the variable current-strength type. In Fig. 2 the transmitting tracer 39, and parts connected thereby, are shown out of unison position, that is to say, in the position that they would assume in transmitting a message to the receiver. They may be returned manually to unison position, that is to say, with the tracer 39 over a push button 54, (Fig. 2) but preferably such movement is effected, and the transmitting tracer and connected parts held in unison position, by a spring 56 connected at one end with a collar 57, upon the hub 49, and at the other with a collar 57' fixed to the downwardly projecting end of the tracer arm 47 (Fig. 4). The push button 54, just referred to, and the contact plate 5, heretofore referred to, constitute the master switch mechanism in the present case controlling, as it does, the electrical connection between the source of power, namely, battery 3, and the right and left lines, this connection being closed when contact plate 5 is engaged with stationary contact 10, and open when it is disengaged therefrom. Push button 54 it will be observed (Figs. 6, 7) projects upwardly through an opening in top plate E, and is provided at its lower end with a stem 58 extending through an opening in slab F and fast to contact plate 5, so that, when said push button is depressed, contact plate 5 engages stationary contact 10, and when said push button is raised, contact plate 5 is disengaged, by its resiliency, from said contact 10. For the purpose of holding contact plate 5 and stationary contact 10 in engagement during a transmitting operation, push button 54 is provided with a notch 59 (Fig. 7), which, by a slight lateral movement of the push button, is engaged with the top plate E.

Turning now to the receiver B, and, incidentally, the receiver C, it will be noted that the rectilinearly movable coils of prior commercial systems, are replaced in the present case by oscillatory members, namely, the armatures 60, 61 of the electro-magnets 24, 34, respectively, which armatures are of iron or similar magnetizable material and, it will be observed, are mounted so as to oscillate in the field provided for them (Figs. 12-15, 18). These armatures are very small, considering the work they are called upon to perform, and, as they are the only magnetic devices moved by the current traversing the main lines, it will be obvious that very little power is required to move them, and that, therefore, quite a saving in current, and, consequently, cost of operation, is effected. Also, it will be observed, that with them no local source of electric energy is required for exciting their magnetic fields, namely, magnets 24, 34, these being excited by the line currents from battery 3 located at the transmitter, which is also a feature of importance, not only because of the saving in cost of current, and, therefore, cost of operation, but also because it frequently happens in the installation of telautographic apparatus that no already-existing source of direct-current supply is available at the point where the receiver is installed, so that the installation of a battery or other source of current supply is necessary for the receiver local circuits.

The direction and extent of the oscillatory movements of these armatures 60, 61, will, of course, depend upon the variations from time to time in the strength of the current traversing the right and left tracer lines respectively, and as these variations are controlled by the transmitting tracer 39, it will be obvious that the armatures 60, 61 will be oscillated or rocked in directions and to an extent depending upon the direction and extent of the lateral writing movements of the transmitting tracer 39, and, therefore, the direction and extent of movement of contact rollers 17, 28, lengthwise of rheostats 1, 2. As the two armatures 60, 61 are alike in construction and in mounting, a detailed description of one will suffice. Selecting, therefore, the armature 61, it will be observed on reference to Figs. 12-15, 18, that it is fixed to a shaft 62 journaled at one end in a plate 63 secured to the ends of the magnet, and at the other end in a plug 64, the shank 65 of which fits in an opening in the heel 66 of the magnet, which is suitably secured to slab G. This plug 64 is provided with a milled head 67, by which it may be turned for adjustment relatively to its socket or opening in the heel iron 66, and a set screw 68 is also provided for locking it in the position to which it may be adjusted. Such adjustment is for the purpose of in turn adjusting the tension of a spiral spring 70 coiled about the shaft 62, one end of which is connected with the plug 64, and the other end of which has a free fit over a collar 71 having a squared or other non-circular opening corresponding to the shape in cross section of the shaft 62, so that said collar is turned with, but may be moved longitudinally of, said shaft. The turns of the spring around the collar 71 are separated sufficiently to clear a set screw 72 fast to said collar, but the spring is rigidly locked to said collar when the set screw is tightened. The object of this peculiar arrangement is to provide for two adjustments of the spring, one of which, that of varying the lengths of the spring, is made by loosening the set screw 68 in the heel iron and rotating the milled head 67 of the plug 64, thus causing the spring to rotate and the collar 71 to travel longitudinally of the shaft in one direction or the other according to the direction in which the milled head 67 is rotated, the spring being then locked to the collar 71 by the set screw 72. The other adjustment affects the tension of the spring, and is made by rotating the plug after the spring has been locked to the collar 71, and when such adjustment of tension is secured the spring is locked in its position of adjustment by the set screw 68. The function of this spring 70 is to oppose the force of the magnetic field in moving the armature, the spring (when the receiver is at unison) holding the armature 61 in its normal, or, what may be termed, its retracted position, and resisting the force of the magnetic field to move it from that position or any position it may assume in the writing field.

The shafts 62 of the armatures 60, 61, have secured to them (Figs. 12–15) a pair of the levers 75, 76, respectively, the outer ends of which are connected by links 77, 78, respectively, with a pen arm 79 carrying at its forward end the receiving pen 40, and pivotally connected at its opposite end with one end of a rod 80, the opposite end of which is pivotally mounted on a shaft 81 secured in a bracket 82 projecting from slab G. The connection between the levers 75, 76 and the shafts 62, may be made in any way suitable for the purpose of securing accurate oscillatory movement of these levers as the oscillating armatures 60, 61 are moved in one direction by the force of the magnetic fields in which they are located and in the other by the opposing springs 70. It will be obvious that the armatures 60, 61, as they are oscillated, will, through the pen-moving parts just described, move the receiving pen 40 laterally so as to reproduce therein, in extent and direction, the lateral movements of the transmitting tracer 39 up and down and crosswise of the transmitter platen 55.

The extent of movement of armatures 60, 61 in either direction, is small, the factor of inertia (which is important in telautographic apparatus where the pen-moving coils or armatures are necessarily massive) being thereby reduced to the minimum, but the resulting movement of the receiving pen 40 over its writing field is extensive. This extensive movement of the receiving pen is secured by the peculiar connection shown and described between the armatures 60, 61, and receiving pen. In this construction with the links 77, 78 connected with pen arms 79 at a point intermediate its ends and at approximately two-thirds its length from the pen, the small amount of movement of magnets 60, 61 is magnified at the pen 40, so that it is possible to give the latter a wide range of movement over its writing field in all directions.

In addition to the lateral movements of the receiving pen 40, which have just been described, it is necessary, of course, to provide for the movement of the receiving pen in and out or to and from its recording or writing platen strip 91, as the transmitting tracer 39 is so moved relatively to its recording strip or its writing platen 55, and it is necessary also that such movements of the receiving pen should be controlled by the transmitting tracer, because the receiving pen must be so moved as the transmitting tracer is so moved. This is done in the present case by the following means: The receiver is provided with a pen-lifter magnet 92 (Fig. 1) which is connected by wire 93 in series with a condenser 94 from the right line wire 22, and to ground by wires 95, 26, 27. The cores 96 of the pen-lifter magnet 92 (Figs. 12, 13, 17) project through openings in the platen 97 of the receiving instrument, the armature 98 of said magnet being yoke-shaped in cross section and fixed to a shaft 99 journaled in ears 100 projecting from the receiver platen 97. Also fixed to this shaft 99 is a pen rest 101 adapted to engage pen arm 79 and move it outwardly. Fixed to said shaft 99 is also a weight 102 (Fig. 17), which tends to rock the shaft 99 away from the platen 97 and therefore rock the armature 98 and pen rest 101 away from the magnet 92 and platen 97. Magnet 92 is supported in proper relation to the receiving pen 40 by platen 97, and the latter is, in turn, supported in proper relation to the receiving pen by bolts 103 passing through ears 104 projecting from plates 63.

Normally, that is to say, when no current is on line between the transmitting and receiving instruments, pen lifter magnet 92 is deënergized and its armature and pen rest 101 are swung, by weight 102, outwardly or away from the writing platen, with the result that the pen rest 101, engaging pen arm 79, will move and retain the receiving pen 40 out of contact with its record strip 91. When current is on the tracer lines, and, therefore, on the right line, pen-lifter magnet 92 will be alternately energized and deënergized, depending upon the condition of the current traversing the right tracer line, as presently explained. When energized, it will attract its armature, and thus rock shaft 99, and move pen rest 101 inwardly toward the platen, with the result that pen levers 75, 76, by their own resiliency or that of a spring, will move toward platen 97 and move receiving pen 40 into contact with the record strip 91 thereon. When deënergized, it will release its armature, shaft 99 being then rocked in the opposite direction and pen rest 101 moved away from platen 97, and, in turn, moving receiving pen 40 away from contact with its record strip 91. Such energization and deënergization of the pen-lifter magnet 92 are controlled from the transmitter, as follows: Referring to Fig. 1, it will be observed that the transmitting station is equipped with an interrupter buzzer group comprising magnet 105 included in a branch of the current-supplying circuit heretofore described, such branch circuit consisting of a contact 106 engaging contact plate 5, wire 107, contact 108 carried by armature 109 of magnet 105, contact 110, wire 111, wire 112, magnet 105, and wire 113 connecting with wire 16 (of the current-supplying circuit) leading to the negative pole of battery 3. Wires 114, 115 connect a condenser 116 with this branch circuit, and also, through arm 18, with the right tracer line leading to the receiver and through electro-magnet 24 and pen-lifter magnet 92, as before described. In the normal position of the transmitting platen, that is to say, while it is in its uppermost position, contact 106 is out of contact with plate 5, and when said platen is depressed, as by the pressure of the hand or tracer in writing, it is engaged therewith. Of course, until contact plate 5 is depressed by push button 54 into engagement with contact 10, the current-supplying circuit from battery 3 is open, as is also the branch through magnet 105. When, however, in order to transmit a message to the receiver, contacts 5 and 10 are engaged with each other by the transmitting operator, the current-supplying circuit is closed. While platen 55, and, therefore, contact plate 5 are raised and the latter out of engagement with contact 106, the direct current traversing the right tracer line does not affect pen-lifter magnet 92 because of the interruption of the condenser 94 between it and the right line, although such current does, of course, affect magnet 24. When, however, contacts 5 and 106 are engaged, the branch circuit through magnet 105 is closed. In this position of contacts 5 and 106, the transmitting tracer is lowered or in pressing contact with platen 55, that is, in writing engagement with the platen or the record strip thereon. Current then traversing the branch circuit described will pass through magnet 105, and, when magnet 105 has become sufficiently charged thereby for the purpose, said magnet will attract its armature 109, and withdraw contact 108 from engagement with contact 110, thereby breaking this branch circuit. Condenser 116 will then discharge to ground through magnet 105 by wires 114, 112, 113, 16, etc. The pull of magnet 105 on its armature will then decrease until it reaches a point where it will release its armature 109, when the branch circuit will again be closed through magnet 105, and so on, condenser 116 discharging each time said circuit is so broken. At the same time condenser 94 will also discharge over the right tracer line to ground at 4. The result of this operation is that there are superimposed on the right tracer line, and on the line through magnet 92, vibratory current waves, to which the pen-lifter magnet 92 is susceptible, so that said magnet becomes energized and attracts its armature 98, which it holds in retracted position so long as this vibratory condition of current continues. Rock shaft 99 is, therefore, rocked inwardly by armature 98 and pen rest 101 swung toward magnet 92. Pen rest 101, thus moved, will, in turn, be moved away from supporting engagement with pen arm 79 and pen 40 then moved toward receiving platen 97, which is the position at the time of the transmitting tracer 39 relatively to its platen 55. Magnet 92 will continue in this condition and pen 40 continue away from its platen so long as the engagement of contacts 5 and 106 at the transmitter continues, although it will be understood, of course, that the receiving pen will, in this position, still follow and reproduce such lateral movements as may be given the transmitting tracer by the transmitter operator. When the operator raises the transmitter tracer from contact with the platen 55, and the latter rises, contact plate 5 will be disengaged from contact 106 and the branch circuit through buzzer magnet 105 be broken. The alternating waves on the right tracer line will then cease and pen-lifter magnet 92 therefore be deënergized, and, release its armature 98. Pen rest 101 will then be rocked outwardly, by shaft 99 and weight 102, and, engaging pen arm 79, move the receiving pen 40 away from platen 97 and out of contact with its record strip. This deënergized condition of magnet 92 will, of course, continue so long as transmitter platen 55 is raised.

The vibratory condition of current just described for effecting the movement of the receiving pen into contact with its writing platen or record strip, and retaining it in that relation thereto while the transmitting tracer occupies a corresponding position relatively to its writing platen, is also utilized in the present case for another purpose, namely, that of vibrating the pen-moving parts in the receiver to reduce or overcome their inertia during a transmitting operation.

In order to provide for the up and down movements referred to of transmitter platen 55, said platen is located in a suitable opening in the top plate E of the transmitter, and mounted upon a pair of arms 120 fixed to a shaft 121 pivotally mounted in lugs 122. It is held normally and returned to its uppermost position by the resiliency of spring contact plate 5, which is secured midway of its length to the slab F, platen 55 being connected with one of its free ends by a screw and post 123.

To the left of the platen 97, and slightly below the unison point of the receiving pen 40, an ink well 124 is suitably supported from the platen and provided with a wick 125, of suitable material, immersed in the ink and projecting upwardly from the bottle into position to be engaged by the point of the pen when at unison. The wick may be so arranged that the pen point will engage it and be inked on the movement of the receiving pen to its extreme left or unison point, or it may be so arranged, back of the plane of lateral movement of the receiving pen, that in order to ink the pen point, the receiving pen 40 must also be moved inwardly after reaching unison position. Such additional movement of the receiving pen will be effected by the transmitter operator, after moving the transmitter tracer 39 to unison, by simply depressing transmitter platen 55 by hand, when, as just above described, pen lifter magnet 92 will be energized, pen rest 101 withdrawn from pen-supporting position, and receiving pen 40 moved inwardly, with its point engaging wick 125.

Means are also provided in the present case for shifting the paper at the receiver at the will of the transmitter operator. No means is shown for shifting the paper at the transmitter, as none is necessary, and if one be desirable, any of the well known means for the purpose may be adopted. The paper shifting means at the receiver includes a paper shifting magnet 130 included in a third circuit from the transmitter, traced as follows: Contact 10, connected with the positive pole of battery 3, as before described, contact plate 5, wires 11, 131, 132, 133, paper shifter magnet 130, and wires 134, 26, 27, to ground at 4. The paper strip 91 at the receiver is in the form of a roll 135 wound upon a core, through which is passed a removable spindle 136 journaled in bearings in brackets 137 secured to the slab G. This paper strip is led from the roll under a guide 138 and over the writing platen 97, and thence to a take-up reel 139 loosely mounted on a spindle 140 removably secured in brackets 141 projecting from slab G. Platen 97 preferably includes a plate 142 extending across it and provided at its ends with side guides 143 for engaging the paper strip at its edges. Take-up reel 139 has at one end a ratchet 145 engaged by a pawl 146 pivotally mounted on the outer end of a rock arm 147, the other end 148 of which is journaled in brackets 149 secured to the cores of the magnet 130, and between which the armature 150 of said magnet moves. A spring 151 connected with arm 147 and pawl 146 holds said pawl yieldingly in engagement with ratchet 145. A spring 152 connected with one of the brackets 149, and with the rock arm 147, tends to move said arm 147, and with it, pawl 146, to their upper position. Armature 150 is rigidly connected at its lower end with the journaled end of rock arm 147, so that when said magnet 130 is energized, armature 150 will be rocked inwardly and the outer end of rock arm 147 will be rocked downwardly, carrying with it the pawl 146, which will then rotate ratchet 145 and therefore take-up reel 139 a predetermined distance. When magnet 130 is deënergized, arm 147 will be rocked upwardly, and armature 150 outwardly, by spring 152, and pawl 146 thus moved upwardly, and, in doing so, travel idly over ratchet wheel 145. When magnet 130 is again energized and then deënergized, the operation is repeated. As the making and breaking of the circuit for magnet 130 is controlled by contact plate 5 at the transmitter, it results that whenever such plate is engaged with contact 10, by depression of push button 54, magnet 130 will be energized and take-up reel 139 rotated to feed the paper strip 91 upwardly across the writing platen 97 a predetermined distance, and, further, that by repeated depressions of push button 54, the transmitter operator may shift the receiver strip any distance he desires. The take-up reel 139 is provided also with a compensating device for regulating the paper feed, in accordance with the increasing thickness of the roll wound on reel 139, so that at each paper shift a like amount of paper will be shifted. This consists of an arm 155 journaled in a hub 156 secured to an ear 157, projecting from one of the brackets 149, the inner end of this arm projecting beyond bracket 149, providing a stop 158, engaging a stop 159 on the armature, for limiting the outward movement of the latter, and, therefore, the upward movement of rock arm 147 and pawl 146. It will be obvious that as the thickness of the roll of paper on reel 139 increases, rod arm 155 will be rocked outwardly, and stop 158, carried thereby, rocked upwardly, thus reducing the movement outward of armature 150, and therefore, the upward and downward movement of arm 147 and pawl 146. No claim is made herein to this compensating mechanism.

What is claimed is:—

1. In a telautographic system of the variable current strength type, the combination of right and left tracer lines connecting the transmitter and receiver, a source of current supply therefor, a transmitting tracer and connections controlling the strength of the currents traversing the tracer lines in accordance with the movements of the tracer over its writing field, and direct current electro-magnetic devices connected with the tracer lines at the receiver and provided with armatures of iron or similar magnetizable material arranged to oscillate varying distances as the strength of the current traversing the tracer lines varies, connections between said armatures and the receiving pen for moving the latter over its writing field, means controlled by the transmitting tracer for impressing a pulsating current on one of the tracer lines, a branch circuit at the receiver connected to said tracer line, and means in said branch circuit and arranged to be actuated by the pulsating current for controlling the movements of the receiving pen to and from its writing surface.

2. In a telautographic system of the variable current type, the combination of right and left tracer lines connecting the transmitter and receiver, a current supplying circuit, a transmitting tracer and connections controlled thereby for shunting therefrom into the tracer lines currents varying in strength in accordance with the movements of the tracer over its writing field, direct current electro-magnetic devices connected with the tracer lines at the receiver and provided with armatures of iron or similar magnetizable material arranged to oscillate varying distances as the strength of the currents traversing the tracer lines varies, connections between said armatures and the receiving pen for moving the latter over its writing field, means controlled by the transmitting tracer for impressing a pulsating current on one of the tracer lines, a branch from the latter tracer line at the receiver, and means in said branch and actuated by the pulsating current for controlling the movements of the receiving pen to and from its writing surface.

3. In a telautographic system of the variable current strength type, the combination of right and left tracer lines connecting the transmitter and receiver, a source of current supply therefor, a transmitting tracer and connections controlling the strength of the currents traversing the tracer lines in accordance with the movements of the tracer over its writing field, direct current electro-magnetic devices connected with the tracer lines at the receiver and provided with armatures of iron or similar magnetizable material arranged to oscillate varying distances as the strength of the currents traversing the tracer lines varies, connections between said armatures and the receiving pen for moving the latter over its writing field, means controlled by the transmitting tracer for impressing a pulsating current on one of the tracer lines, a branch from the latter tracer line at the receiver, means in said branch circuit and arranged to be actuated by the pulsating current, for controlling the movements of the receiving pen to and from its writing surface, and electro-magnetic paper-shifting devices at the receiver controlled in their operation from the transmitter.

4. In a telautographic system of the variable current strength type, the combination of right and left tracer lines connecting the transmitter and receiver, a current supplying circuit, a transmitting tracer and connections controlled thereby for shunting therefrom into the tracer lines currents varying in strength in accordance with the movements of the tracer over its writing field, direct current electro-magnetic devices connected with the tracer lines at the receiver and provided with armatures of iron or similar magnetizable material arranged to oscillate varying distances as the strength of the currents traversing the tracer lines varies, connections between said armatures and the receiving pen for moving the latter over its writing field, means controlled by the transmitting tracer for impressing a pulsating current on one of the tracer lines, a branch connected to the latter tracer line at the receiver, means in said branch and arranged to be actuated by the pulsating current for controlling the movements of the receiving pen to and from its writing surface, and electro-magnetic paper-shifting devices at the receiver and controlled in their operation from the transmitter.

5. In a telautographic system of the variable current strength type, the combination of right and left tracer lines connecting the transmitter and receiver, a current supplying circuit, a transmitting tracer and connections controlled thereby for shunting therefrom into the tracer lines currents varying in strength in accordance with the movements of the tracer over its writing field, direct current electro-magnetic devices connected with the tracer lines at the receiver and provided with armatures of iron or similar magnetizable material arranged to oscillate varying distances as the strength of the currents traversing the tracer lines varies, connections between said armatures and the receiving pen for moving the latter over its writing field, means controlled by the transmitting tracer for impressing a pulsating current on one of the tracer lines, a branch connected to the latter tracer line at the receiver, means included in said branch and arranged to be actuated by the pulsating current for controlling the movements of the receiving pen to and from its writing surface, electro-magnetic paper-shifting devices at the receiver, and a master switch at the transmitter controlling their operation.

6. In a telautographic system of the variable current strength type, the combination of right and left tracer lines connecting the transmitter and receiver, a source of current supply therefor, a transmitting tracer and connections controlling the strength of the currents traversing the tracer lines in accordance with the movements of the tracer over its writing field, direct current electro-magnetic devices connected with the tracer lines at the receiver, armatures of magnetizable material arranged to oscillate varying distances as the strength of the currents traversing the tracer lines varies, a spring for holding each armature in its normal position, connections between said armatures and the receiving pen for moving the latter over its writing field, means controlled by the transmitting tracer for impressing a pulsating current on one of the tracer lines, a branch from the latter tracer line at the receiver, and electro-magnetic means included in said branch and actuated by the pulsating current for controlling the movements of the receiving pen to and from its writing surface.

7. In a telautographic system of the variable current strength type, the combination of right and left tracer lines connecting the transmitter and receiver, a source of current supply therefor, a transmitting tracer and connections controlling the strength of the currents traversing the tracer lines in accordance with the movements of the tracer over its writing field, magnetic fields arranged in the tracer lines at the receiver so that the strength of said fields will vary as the strength of the main line currents varies, armatures of iron or similar magnetizable material arranged to oscillate varying distances in said fields as the strength thereof varies, connections between said armatures and the receiving pen effecting movements of the pen over its writing field varying in extent and direction according to the extent and direction of oscillation of said armatures, means controlled by the transmitting tracer for producing a vibratory condition in the current traversing one of the tracer lines, and electro-magnetic devices at the receiver controlled by such vibratory current condition and controlling the movements of the receiving pen to and from its writing surface.

8. In a telautographic system of the variable current strength type, the combination of right and left tracer lines connecting the transmitter and receiver, a current supplying circuit, a transmitting tracer and connections controlled thereby for shunting therefrom into the tracer lines currents varying in strength in accordance with the movements of the tracer over its writing field, magnetic fields at the receiver connected with the tracer lines so that the strength thereof will vary as the strength of the main line currents varies, armatures of iron or similar magnetizable material arranged to oscillate varying distances in said fields as the strength thereof varies, connections between said armatures and the receiving pen effecting movements of the pen over its writing field varying in extent and direction according to the extent and direction of oscillation of said armatures, means controlled by the transmitting tracer for producing a vibratory condition in the current traversing one of the tracer lines, and electro-magnetic devices at the receiver controlled by such vibratory current condition and controlling the movements of the receiving pen to and from its writing surface.

9. In a telautographic system of the variable current-strength type, the combination of right and left tracer lines connecting the transmitter and receiver, a source of current supply therefor, a transmitting tracer and connections controlling the strength of the currents traversing the tracer lines in accordance with the movements of the tracer over its writing field, electro-magnetic devices connected with the tracer lines at the receiver and provided with armatures arranged to oscillate varying distances as the strength of the currents traversing the tracer lines varies, a receiving pen-arm pivotally connected with a stationary support and carrying the receiving pen, a pair of links pivotally connected with the pen arm between its pivoted portion and the receiving pen, levers oscillated by said armatures and pivotally connected with said links for moving the receiving pen over its writing field, and electro-magnetic devices at the receiver and controlled by the transmitting tracer for controlling the movements of the receiving pen to and from its writing surface.

10. In a telautographic system of the variable current-strength type, the combinatiton of right and left tracer lines connecting the transmitter and receiver, a source of current supply therefor, a transmitting tracer and connections controlling the strength of the currents traversing the tracer lines in accordance with the movements of the tracer over its writing field, electro-magnetic devices connected with the tracer lines at the receiver and provided with armatures arranged to oscillate varying distances as the strength of the currents traversing the tracer lines varies, a rod pivotally mounted in a stationary support, a pen-arm pivotally connected with said rod and carrying the receiving pen, a pair of links pivotally connected with the pen arm between its pivoted portion and the receiving pen, levers oscillated by said armatures and pivotally connected with said links for moving the receiving pen over its writing field, and electro-magnetic devices at the receiver and controlled by the transmitting tracer for controlling the movements of the receiving pen to and from its writing surface.

11. In a telautographic system of the variable current-strength type the combination of right and left tracer lines connecting the transmitter and receiver, a source of current supply therefor, a transmitting tracer and connections controlling the strength of the currents traversing the tracer lines in accordance with the movements of the tracer over its writing field, electro-magnetic devices connected with the tracer lines at the receiver and provided with members arranged to move varying distances as the strength of the currents traversing the tracer lines varies, a receiving pen-arm pivotally connected with a stationary support and carrying the receiving pen, a pair of links pivotally connected with the pen arm between its pivoted portion and the receiving pen, levers oscillated by the movable members of said magnetic devices and pivotally connected with said links for moving the receiving pen over its writing field, and electro-magnetic devices at the receiver and controlled by the transmitting tracer for controlling the movements of the receiving pen to and from its writing surface.

12. In a teleautographic system of the variable current-strength type, the combination of right and left tracer lines connecting the transmitter and receiver, a source of current supply therefor, a transmitting tracer and connections controlling the strength of the currents traversing the tracer lines in accordance with the movements of the tracer over its writing field, electro-magnetic devices connected with the tracer lines at the receiver and provided with members arranged to move varying distances as the strength of the currents traversing the tracer lines varies, a rod pivotally mounted in a stationary support, a pen arm pivotally connected with said rod and carrying the receiving pen, a pair of links pivotally connected with the pen arm between its pivoted portion and the receiving pen, levers oscillated by the movable members of said magnetic devices and pivotally connected with said links for moving the receiving pen over its writing field, and electro-magnetic devices at the receiver and controlled by the transmitting tracer for controlling the movements of the receiving pen to and from its writing surface.

13. In a teleautographic system of the variable current-strength type, the combination of right and left tracer lines connecting the transmitter and receiver, a source of current supply therefor, a transmitting tracer and connections controlling the strength of the currents traversing the tracer lines in accordance with the movements of the tracer over its writing field, electro-magnetic devices connected with the tracer lines at the receiver and provided with oscillating members arranged to move varying distances as the strength of the currents traversing the tracer lines varies, coiled springs inclosing and opposing such movements of the oscillating members, each of said springs being connected at one end with an adjustable part at one end of the oscillating member and at the other end adjustably connected with a collar slidably connected with the oscillating member.

In testimony whereof, I have hereunto set my hand in the presence of two subscribing witnesses.

GEORGE S. TIFFANY.

Witnesses:
  A. White,
  T. F. Kehoe.